United States Patent [19]

Denton et al.

[11] Patent Number: 5,019,224

[45] Date of Patent: May 28, 1991

[54] ELECTROLYTIC PROCESS

[75] Inventors: David A. Denton, Warrington; Peter C. S. Hayfield, Bickenhill, both of Great Britain

[73] Assignee: Imperial Chemical Industries PLC, London, England

[21] Appl. No.: 479,689

[22] Filed: Feb. 14, 1990

[30]     Foreign Application Priority Data

Feb. 14, 1989 [GB] United Kingdom ............... 8903322

[51] Int. Cl.$^5$ ..................... C25D 3/30; C25D 3/22
[52] U.S. Cl. ................. 204/54.1; 204/55.1; 204/105 R; 204/290 F
[58] Field of Search ............. 204/290 F, 54.1, 55, 204/105 R

[56]           References Cited

U.S. PATENT DOCUMENTS

| | | | |
|---|---|---|---|
| 4,471,006 | 9/1984 | Asano | 204/290 F |
| 4,515,673 | 5/1985 | Hayfield | 204/290 F |
| 4,765,879 | 8/1988 | Matsumoto | 204/290 F |

Primary Examiner—John F. Niebling
Assistant Examiner—Caroline Koestner
Attorney, Agent, or Firm—Cushman, Darby & Cushman

[57]             ABSTRACT

An electrolytic process in which an aqueous electrolyte is electrolysed in an electrolytic cell which comprises at least one anode and at least one cathode, in which oxygen is evolved at the anode, and which is operated at an anode current density of at least 3kA/m$^2$, in which the anode comprises a substrate having at least in part an outer surface of tantalum, or of an alloy thereof, at least part of the tantalum or tantalum alloy substrate having a coating of an electrocatalytically-active material.

The anode may be a tantalum-clad titanium substrate, and the process may be, for example, an electrogalvanizing or electrotinning process.

11 Claims, No Drawings

ELECTROLYTIC PROCESS

This invention relates to an electrolytic process and in particular to an electrolytic process in which oxygen is evolved at the anode of the electrolytic cell in which the process is effected.

Many electrolytic processes are practised on an industrial scale in which oxygen is evolved at the anode of the electrolytic cell in which the process is effected, and in many of these processes a metal is deposited on the cathode of the electrolytic cell. Examples of such processes include the electrowinning of metals, e.g. of copper, zinc and nickel, and electoplating processes, e.g. the electroplating of chromium and nickel onto a steel substrate. Certain processes of the latter type are practised industrially on a very large scale, as in the electrogalvanising of steel, especially steel strip, with a coating of zinc, and the electrotinning of steel with a coating of tin. Such processes are generally operated with an aqueous electrolyte, e.g. with an aqueous acidic electrolyte, at an elevated temperature which may be as high as 60° C. or 70° C. or even higher, and such processes are generally operated at very high anode current densities, e.g. at anode current densities which may be greater than 10 $kA/m^2$ and even up to 40 $kA/M^2$ or even higher.

Processes of the aforementioned types are thus operated under particularly severe conditions and it has proved to be difficult to find a material for use as the anode in the electrolytic cell which is as long-lasting as may be desired, particularly when the processes are operated at the very high anode current densities which are necessary for viable economic operation of the processes.

In recent years anodes which have been used in such electrolytic processes have comprised a substrate of titanium or of an alloy of titanium possessing properties similar to those of titanium and a coating of an electrocatalytically-active material on the surface of the substrate. An uncoated titanium anode could not be used in such an electrolytic process as the surface of the titanium would oxidise when anodically polarized and the titanium would soon cease to function as an anode. The use of such a coating of electrocatalytically-active material is essential in order that the titanium shall continue to function as an anode. Examples of such electrocatalytically-active materials include metals of the platinum group, oxides of metals of the platinum group, mixtures of one or more such metals and one or more such oxides, and mixtures or solid solutions of one or more oxides of a platinum group metal and one or more oxides of a valve metal, that is one or more oxides of titanium, tantalum, zirconium, niobium, hafnium or tungsten.

However, it has been found that although such coated titanium anodes do have a reasonably long lifetime they do not have a lifetime which is as long as may be desired, particularly when the electrolytic processes in which oxygen is evolved at the anodes are operated under severe conditions.

Failure of such coated titanium anodes, which is judged to occur when the voltage rises to an unacceptably high value, may be due to several causes one of which is that the electrocatalytically-active coating on the surface of the titanium substrate wears away during use so that the anode must eventually be recoated. However, there is another cause of anode failure which it is believed may be of importance, especially under severe operating conditions, particularly where oxygen is evolved at high anode current density and at moderate or high temperatures, e.g. at temperatures greater than 50° C. It is believed that under such severe operating conditions an oxide layer is formed on the surface of the titanium substrate of the anode beneath the coating of electrocatalytically-active material. This oxide layer on the surface of the titanium may become a relatively thick layer, and the formation of this oxide layer may eventually lead to an increase in the voltage of the process to an unacceptably high value, in some cases to a relatively sudden and rapid increase in voltage, even when there has been little if any loss of electrocatalytically-active coating from the surface of the anode.

Whatever may be the reason for the relatively short operational lifetime of such titanium anodes coated with an electrocatalytically-active material when used in a high current density electrolytic process in which oxygen is evolved at the anode we have found that the nature of the substrate of the anode may be changed in order to produce an anode of improved operational lifetime. In particular, we have found that such anodes may be modified in order to effect a useful improvement in the operational lifetime of the anodes.

According to the present invention there is provided an electrolytic process in which an aqueous electrolyte is electrolysed in an electrolytic cell which comprises at least one anode and at least one cathode, in which oxygen is evolved at the anode, and which operated at an anode current density of at least 3 $kA/m^2$, in which the anode comprises a substrate having at least in part an outer surface of tantalum, or of an alloy thereof, at least part of the tantalum or tantalum alloy surface having a coating of an electrocatalytically-active material.

The substrate may consist essentially of tantalum or tantalum alloy. However, as tantalum is an expensive metal, and in particular a metal which is substantially more expensive than titanium, it is preferred to use in the process an anode which comprises a substantial proportion of titanium, or of an alloy of titanium, and in a further and preferred embodiment of the present invention there is provided an electrolytic process in which an aqueous electrolyte is electrolysed in an electrolytic cell which comprises at least one anode and at least one cathode, in which oxygen is evolved at the anode, and which is operated at an anode current density of at least 3 $kA/m^2$, in which the anode comprises a substrate of titanium or of an alloy thereof and an outer surface of tantalum or of an alloy thereof, at least part of the tantalum or tantalum alloy surface of the anode having a coating of an electrocatalytically-active material.

The anode may comprise a core of titanium or of an alloy thereof and an outer surface of tantalum or of an alloy thereof, although it is not essential that the whole of the titanium substrate have an outer surface of tantalum it being sufficient for a part only of the titanium substrate to have such an outer surface.

We are aware that in GB Patent 1 274 242 there is described an electrode which may be used as an anode and which comprises a substrate of titanium or of niobium having bonded thereto a metal foil of tantalum and an outer layer of a platinum group metal foil. Use of the electrode in the electrolytic production of chlorine and hydrochlorite, particularly for use in the chlorination of swimming pool water, is disclosed.

The aforementioned GB Patent thus discloses only selected uses of the anode, namely as an anode in an electrolytic cell in which chlorine and hypochlorite are produced and the GB Patent does not suggest using the anode in an electrolytic cell in which oxygen is evolved at the anode, particularly at high anode current density.

We are also aware that in European Patent 0 107 934 there is disclosed an electrode which may be used as an anode in an electrolytic cell and which comprises a substrate selected from titanium and niobium, an intermediate layer of tantalum or of an alloy containing more than 50% of tantalum, and an outer coating of an anodically-active material. Thus, the aforementioned European Patent also describes an anode which is of the type which features in the electrolytic cell used at least in the preferred embodiment of the process of the present invention. However, the aforementioned patent discloses only a particular type of anodically active layer, namely a layer which has been produced by heating in an oxidising atmosphere at a temperature in excess of 350° C., and it is primarily concerned with the beneficial effect which the tantalum intermediate layer has in avoiding the unwanted oxidation of the titanium surface, and particularly of the niobium surface, of the anode when such an anodically-active layer is applied directly to a titanium or niobium surface by a process which involves heating in an oxidising atmosphere at a temperature in excess of 350° C. In the aforementioned patent electrolytic uses involving evolution of oxygen at the anode are disclosed, in addition to other uses which do not involve oxygen evolution, such as the production of and hydrochlorite and the production of potable water from brackish water. However, the major application which is disclosed and which may involve evolution of oxygen at the anode is use of the anode in cathodic protection, e.g. of steel-reinforced concrete structures and of ground-buried structures. In such cathodic protection applications, however, the current density of operation is very small, generally of the order of several hundred milliamps per square meter of anode, whereas in the process of the present invention the anode current density is at least three, and possibly four, orders of magnitude greater. Other electrolytic applications which involve anodic evolution of oxygen are described in the aforementioned patent but there is no suggestion in the patent that the anode may be used in an electrolytic process in which oxygen is evolved at the anode and which is operated at the very high anode current densities envisaged in the process of the present invention, that is which is operated under very severe conditions, and the long active life of the anode when used under the severe conditions of the process of the present invention is most unexpected.

The nature and structure of the electrolytic cell in which the process of the present invention is effected, and in particular the nature and structure of the anode in the cell, will vary depending upon the nature of the electrolytic process which is effected in the cell. For example, the nature and structure of the electrolytic cell and of the anodes will vary depending upon whether the electrolytic process in which oxygen is evolved at the anode is an electrowinning process, an electroplating process, an electrogalvanising process or an electrotinning process. However, as the inventive feature does not reside in the nature or structure of the electrolytic cell nor of the anodes therein there is no necessity for the cell or anodes to be described in any detail. Suitable types and structures of electrolytic cell and of anodes may be selected from the prior art depending on the nature of the electrolytic process.

The inventive features of the process essentially resides in the nature of the anode present in the electrolytic cell in which the process is effected, coupled with the realisation that the process may be operated under very severe conditions, particularly at high anode current density and various embodiments of the anode will now be described.

Where the anode comprises a substrate of titanium or of an alloy thereof and at least in part an outer surface of tantalum or of an alloy thereof, at least part of the tantalum surface of the anode has a coating of an electrocatalytically-active material. The titanium part of the anode will, for simplicity, be referred to hereafter as the core.

The core may be made of titanium or of a titanium alloy, that is of an alloy containing titanium and having properties similar to those of titanium, and hereafter titanium only will be referred to it being understood that use of the expression titanium also includes alloys thereof. Alternatively, the core may comprise only an outer surface of titanium on a base of another metal, e.g. copper, aluminium or steel.

The titanium core of the anode has an outer surface of tantalum or of an alloy thereof, on at least a part, and possibly on the whole of the surface of the core. Where the tantalum is in the form of an alloy it has properties similar to those of tantalum, and hereafter tantalum only will be referred to it being understood that use of the expression tantalum also includes alloys thereof. Several methods may be used to apply a layer of tantalum to a core of titanium the particular method of application which is chosen depending to some extent on the structure of the anode. For example, pieces of titanium and of tantalum may be co-extruded to produce a structure of titanium clad with a layer or layers of tantalum Such a co-extrusion process may be used, for example, to produce an anode in the form of a sheet of titanium which is clad with a layer of tantalum. Also a rod of titanium and an outer tube of tantalum may be co-extruded to produce a titanium rod anode clad with a layer of tantalum. An anode in the form of a sheet of titanium clad with a layer or layers of tantalum may be produced by explosion bonding of a sheet or sheets of tantalum to a sheet of titanium, and if necessary the explosion bonded sheet may be extruded, or the anode may be produced by roll-bonding the sheets followed by diffusion bonding, or by welding a tantalum sheet to a titanium sheet, e.g. by spot welding or seam welding.

The methods which have been described are generally suitable for producing an anode of titanium clad with a layer of tantalum which are of relatively simple profile. Other methods may be used to produce such anodes which are of simple profile and also which are of more complex profile. For example, a layer of tantalum may be applied to a titanium core by electrolytic deposition, Thus, the titanium core may be a cathode in an electrolytic cell containing a solution of a tantalum compound or a molten tantalum salt and tantalum may be deposited electrolytically onto the titanium cathode. Other methods by which a layer of tantalum may be applied to a titanium core include vacuum deposition and sputtering, ion plating and plasma spraying.

Anodes which are of more complex profile include anodes in the form of a mesh, which may be a woven or non-woven mesh, and anodes in the form of a mesh produced by expanding a metal sheet.

The anode having a titanium core which forms part of the electrolytic cell in which the process of the invention is effected may be a titanium anode which has already been used, or which has been produced for use, in an electrolytic process, e.g. such a process in which oxygen is evolved at the anode. Such a used anode may cleaned, for example by removing any remaining surface coating of electrocatlaytically-active material and by etching the titanium surface, e.g. by immersion in acid, and the titanium core of the anode may then be clad with a layer of tantalum and with an electrocatalytically active coating to produce an anode of superior performance and which is suitable for use in the electrolytic cell in which the process of the present invention is effected.

Cladding the surface of the titanium anode with a layer of tantalum serves not only to prolong the life of the titanium anode but also may serve to rectify mechanical damage suffered by the anode in prior use, e.g. damage caused by shorting.

The layer of tantalum on the core of titanium will have a thickness of a few microns, e.g. at least 5 microns, and generally it will have a thickness of at least 50 microns, preferably at least 500 microns. It will generally be unnecessary, and undesirable for economic reasons, for the thickness of the tantalum layer to be greater than 5 mm.

Any electrocatalytically-active material may be applied to the surface of the anode provided the material enables the anode to continue to function as an anode when it is anodically polarized. However, materials which are preferred for use in the process of the invention include metals of the platinum group, e.g. platinum or iridium, oxides of metals of the platinum group, e.g. iridium oxide, mixtures of one or more such metals and one or more such oxides, e.g. a mixture of platinum and iridium oxide, and mixtures or solid solutions of one or more oxides of a platinum group metal and one or more oxides of a valve metal, that is one or more oxides of titanium, tantalum, zirconium, niobium, hafnium or tungsten e.g. ruthenium and titanium oxides which may be in the form of a solid solution.

Such electrocatalytically-active materials are well-known in the art as are methods of application of the materials. For example, a coating of platinum, ruthenium, palladium, osmium, rhodium, or iridium, may be applied to the surface of the anode electrolytically. If desired; the thus applied coating of platinum group metal may be converted to an oxide by heating the anode in an oxygen-containing atmosphere. A coating of a platinum group metal oxide may be applied to the surface of the anode by coating the anode with a solution or dispersion of a platinum group metal compound in a liquid medium, heating the thus coated anode to dry the applied coating, and firing the dried coating at a higher temperature to convert the platinum group metal compound into the oxide of the platinum group metal. Suitable compounds of a platinum group metal include inorganic salts. e.g. halides, and organometallic compounds. If desired the solution or dispersion of the platinum group metal compound may include a compound of a valve metal so that in the coating which is produced there results a mixture, or a solid solution or mixed crystal of, an oxide of a platinum group metal and an oxide of a valve metal, e.g. a solid solution of ruthenium oxide and titanium oxide.

A post heat treatment step may be included in order to improve the bond between the electrocatalytically-active material and the tantalum surface.

The coating of electrocatalytically-active material will generally be present on the surface of the anode in an amount of at least 1 $gm^{-2}$ of anode surface. However, the active life of the anode is governed to some extent by the amount of coating on the surface thereof and the amount of the coating is preferably at least 5 $g/m^2$. More preferably the amount of coating is at least 10 $g/m^2$ of anode surface. The coating of electrocatalytically-active material may be present on the surface of the anode at a loading of up to 100 $g/m^2$. For the larger loadings of electrocatalytically-active material it may be necessary to make multiple applications in order to build up the desired loading.

Electrocatalytically-active materials which are particularly suitable for use in the process of the invention in which oxygen is evolved at the anode and which is operated at high current density include coatings comprising $IrO_2$, including a coating of $IrO_2$ itself a coating comprising $IrO_2$ in a solid solution with an oxide of a valve metal, e.g. a solid solution of $IrO_2$ and $Ta_2O_5$, and a coating comprising a mixture of Pt and $IrO_2$, e.g. approximately 70 weight % Pt and 30 weight % $IrO_2$. The process of the present invention may be any electrolytic process in which oxygen is evolved at the defined anode and which is operated at an anode current density of at least 3 $kA/m^2$. However, the benefit of prolonged active life of the anode is particularly evident where the process is operated at high anode current density, e.g. at an anode current density of greater than 10 $kA/m^2$, or greater than 20 $kA/m^2$, or even up to 40 $kA/m^2$ or more, as in electrogalvanising and electrotinning processes of the type which are operated commercially, and the process of the invention is preferably such a high anode current density process, e.g. an electrogalvanising or electrotinning process.

In the process the electrolyte will generally be an aqueous electrolyte, usually an aqueous acidic electrolyte which has a pH of 5 or less, generally 3 or less, and in an electrogalvanising or electrotinning process the electrolyte will contain in solution zinc or tin respectively. For example zinc or tin metal may be dissolved in the acidic electrolyte, or the electrolyte may contain a suitable compound of zinc or tin dissolved therein.

The defined anode is particularly suitable for use under very severe electrolysis conditions, particularly high temperature, and the process may be effected at a temperature of greater than 50° C., or even greater than 70° C.

The invention is illustrated by the following examples.

EXAMPLE 1

A 0.5 mm thick sheet of tantalum was explosion bonded to a 3 mm thick sheet of titanium to produce a composite sheet in which the individual sheets where thoroughly bonded to each other.

The tantalum surface of the composite sheet was then grit blasted in order to clean and etch the surface, and the sheet was then washed in water and dried.

The tantalum surface of the composite sheet was brush coated with a solution of 5 g of $H_2IrCl_6$ in 22.5 ml of pentanol, the applied coating was dried by heating the coated sheet in an oven at 100° C., and the dried coating was fired to convert the $H_2IrCl_6$ into $IrO_2$ by heating the coated sheet in air in an oven at 400° C. for 20 minutes. The coating, drying and firing steps were repeated until the loading of $IrO_2$ on the tantalum surface of the composite sheet reached 30 gm m$^{-2}$.

The performance of the coated composite sheet as an anode in an oxygen-evolving electrolysis was then tested.

The coated composite sheet was installed as an anode in an electrolytic cell spaced from a graphite cathode by a distance of 2.0 cm. A synthetic aqueous electrogalvanising liquor comprising 150 gl$^{-1}$ $Na_2SO_4$ and 10 gl$^{-1}$ $FH_2SO_4$ was charged to the cell and electrolysis was carried out at an anode current density of 15 kAm$^{-2}$, the temperature of the liquor in the electrolytic cell being 55° C. Every seven days the liquor was removed from the cell and fresh liquor was charged to the cell.

After 928 hours of electrolysis the anode was removed from the electrolytic cell and examined by X-ray fluorescence spectrometry. There was no detectable loss of $IrO_2$ coating from the anode.

The anode was returned to the electrolytic cell and the electrolysis was continued. After a further 414 hours of electrolysis the anode was again removed from the electrolytic cell and examined by X-ray fluorescence spectrometry. There was still no detectable loss of $IrO_2$ coating from the surface of the electrode. There has been little or no rise in voltage.

EXAMPLE 2

The coating and electrolysis procedure of Example 1 was repeated except that the explosion bonded composite sheet was replaced by a 3 mm thick titanium sheet to which a 100 microns thick layer of tantalum had been applied by ion-plating, and the loading of $IrO_2$ applied to the tantalum surface of the composite sheet was 19.1 gm$^{-2}$.

After 2467 hours of electrolysis examination of the anode revealed that 10.1% of the $I_2O_2$ coating had been lost. There had been little or no rise in voltage.

EXAMPLE 3

The coating procedure of Example 2 was repeated to produce an $IrO_2$ coated tantalum-titanium composite sheet.

The thus produced sheet was then tested as an anode in an electrolytic cell following the procedure described in Example 1 except that the aqueous electrolyte had a pH of 1 and comprised 150 gl$^{-1}$ $Na_2SO_4$ and 25 gl$^{-1}$ $FeSO_4$ and electrolysis was effected at an anode current density of 17 kA m$^{-2}$.

After 2233 hours of electrolysis examination of the anode revealed that 12.8% of the $IrO_2$ coating had been lost. There had been little or no rise in voltage.

EXAMPLES 4 to 6

The procedure of Example 2 was followed to produce a 3 mm thick titanium sheet having a 100 microns thick layer of tantalum deposited on one surface of the sheet, the tantalum layer being deposited by ion plating. The tantalum layer on the resultant composite sheet was then grit blasted, washed and dried following the procedure of Example 1 and the sheet was then cut into three separate pieces.

The tantalum surfaces of the composite sheets were then brush coated with a solution $TaCl_5$ and $H_2IrCl_6$ in pentanol (257 gl$^{-1}$ $TaCl_5$ and 222 gl$^{-1}$ $H_2IrCl_6$), the sheets were dried in an oven at 100° C. and the dried coatings were fired to convert the $TaCl_5$ and $H_2IrCl_6$ to $Ta_2O_5$ and $IrO_2$ by heating the coated sheets in air in an oven at 400° C. The coating drying and firing steps were repeated in order to give the desired coating loading.

The coated surfaces of the composite sheets were then brush coated with a solution of $H_2IrCl_6$ in pentanol, dried and fired following the procedure of Example 1 until the desired loading of $IrO_2$ was achieved.

The total loadings of $IrO_2$ in the coatings on the tantalum surfaces of the composite sheets were 35.1 gm$^{-2}$ 40.3 gm$^{-2}$ and 36.3 gm$^{-2}$ in Examples 4, 5 and 6 respectively.

Each of the composite coated sheets was then subjected to electrolytic testing as an anode following the procedure of Example 1 except that the electrolyte was an aqueous solution having a pH of 1 and contained 150 gl$^{-1}$ of $Na_2SO_4$ and 15 gl$^{-1}$ of $FeSO_4$, the temperature was 70° C., and the anode current density was 15 kAm$^{-2}$.

After 6 months of continuous electrolysis the anodes were examined and the coating loadings determined. The total loadings of $I_2O_2$ on the anodes was 32.4 gm$^{-2}$, 38.6 gm$^{-2}$ and 33.5 gm$^{-2}$ in Examples 4, 5 and 6 respectively, the coating losses being 4.8%, 4.2% and 7.7% respectively. There has been little or no rise in voltage.

EXAMPLES 7 to 10

Four strips of 1 mm thick tantalum of length 150 mm and width 10 mm were roughened by vacqua-blasting to yield Centre Line Average values by Talysurf in the range 44 to 52 micromiches.

Each strip was then coated on one surface thereof following the procedure of Example 1 except that the coating solution used was $IrCl_3$ in pentanol (70 gl$^{-1}$ based on Ir metal) and the loading of $IrO_2$ on the surface of the strips was built up to 25 gm$^{-2}$.

The electrolysis procedure of Example 1 was repeated using each coated strip as an anode except that the electrolyte used was an aqueous solution of 150 gl$^{-1}$ $Na_2SO_4$ and 15 gl$^{-1}$ of $FeSO_4$ having a pH of 1. Electrolysis was effected at 70° C. and at current densities of 10 kAm$^{-2}$ (examples 7 and 8) and 15 kAm$^{-2}$ (Examples 9 and 10).

After 135 days of continuous electrolysis examination of the anodes of examples 7 and 8 revealed coating loadings of 25 gm$^{-2}$ and 21.6 gm$^{-2}$ respectively, and after 108 days of continuous electrolysis examination of the anodes of examples 9 and 10 revealed coating loadings of 23.5 gm$^{-2}$ and 22.7 gm$^{-2}$ respectively. There has been little or no rise in voltage.

We claim:

1. An electrolytic process which comprises electrolysing an aqueous electrolyte in an electrolytic cell having at least one anode and at least one cathode, evolving oxygen at the anode, and effecting the electrolysis at an anode current density of at least 3 kA/m$^2$, in which the anode comprises a substrate of which at least a part thereof is provided with an outer surface of tantalum metal, or of an alloy thereof, at least part of the tantalum metal or tantalum alloy surface having a coating of an electrocatalytically-active material.

2. An electrolytic process which comprises electrolysing an aqueous electrolyte in an electrolytic cell having at least one anode and at least one cathode, evolving oxygen at the anode, and effecting the electrolysis at an anode current density of at least 3 kA/m$^2$, in which the anode comprises a substrate of titanium or of an alloy thereof and an outer surface of tantalum metal or of an alloy thereof on at least part of the substrate, at least part of the tantalum metal or tantalum alloy surface having a coating of an electrocatalytically-active material.

3. A process as claimed in claim 1 in which the anode comprises a core of titanium or of an alloy thereof and an outer surface of tantalum or of an alloy thereof.

4. A process as claimed in claim 1 in which the anode comprises a sheet of titanium clad with a layer of tantalum.

5. A process as claimed in claim 4 in which the layer of tantalum has a thickness in the range 5 microns to 5 mm.

6. A process as claimed in claim 1 in which the coating of electrocatalytically-active material is present in an amount of 1 g/m$^2$ to 100 g/m$^2$.

7. A process as claimed in claim 1 in which the electrocatalytically-active material comprises $IrO_2$ or a mixture of Pt and $IrO_2$.

8. A process as claimed in claim 1 in which the process is operated at an anode current density of greater than 10 kA/m$^2$.

9. A process as claimed in claim 1 in which the aqueous electrolyte is an acidic electrolyte having a pH of 3 or less.

10. A process as claimed in claim 1 which is operated at a temperature of greater than 50° C.

11. A process as claimed in claim 1 which is an electrotinning or an electrogalvanising process.

* * * * *